United States Patent
Safarian et al.

(10) Patent No.: US 7,792,513 B2
(45) Date of Patent: Sep. 7, 2010

(54) DISTRIBUTED RF FRONT-END FOR UWB RECEIVERS

(75) Inventors: Aminghasem Safarian, Irvine, CA (US); Lei Zhou, Irvine, CA (US); Payam Heydari, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 498 days.

(21) Appl. No.: 11/857,696

(22) Filed: Sep. 19, 2007

(65) Prior Publication Data
US 2009/0075613 A1 Mar. 19, 2009

(51) Int. Cl.
H04B 1/16 (2006.01)
(52) U.S. Cl. .................. 455/296; 455/323; 455/325
(58) Field of Classification Search .......... 455/295, 455/296, 304, 315, 317, 318, 323, 325, 327, 455/333; 333/102, 103, 104
See application file for complete search history.

(56) References Cited

U.S. PATENT DOCUMENTS

2008/0032661 A1* 2/2008 Ojo et al. .............. 455/333
2009/0088115 A1* 4/2009 Safarian et al. ........ 455/296

OTHER PUBLICATIONS

Safarian et al., "*Design and Analysis of an Ultrawide-Band Distributed CMOS Mixer*", IEEE Transactions on Very Large Scale Integration (VLSI Systems), vol. 13, No. 5, May 2005, pp. 618-629.

Thomas H. Lee, "*The Design of CMOS Radio-Frequency Integrated Circuits*", Second Edition, Cambridge University Press, pp. 304-306 (1998).

Nathan R. Belk, "*High Performance CMOS Radio Design for Multi Band OFDM UWB*", Powerpoint Presentation, pp. 1-21 (Aug. 22, 2004).

Ismail et al., "*A 3-10-GHz low-noise amplifier with wideband LC-ladder matching network*", IEEE Journal of Solid-State Circuits, vol. 39, Issue 12, three pages (Dec. 2004).

Bevilacqua et al., "*An ultra-wideband CMOS LNA for 3.1 to 10.6 GHz wireless receivers*", IEEE Journal of Solid-State Circuits, vol. 39, Issue 12, three pages (Dec. 2004).

(Continued)

Primary Examiner—Thanh C Le
(74) Attorney, Agent, or Firm—Orrick, Herrington & Sutcliffe LLP

(57) ABSTRACT

Described herein are ultra wide-band distributed RF (UWB-DRF) front-end receivers comprising composite cells distributed along transmission lines, where each composite cell comprises a low-noise amplifier (LNA) merged with a mixer. By merging the LNA and the mixer in each composite cell, the power consumption and chip area of the RF front-end is reduced. Further, the distributed architecture of the RF front-end allows it to operate over a wide bandwidth by absorbing the parasitic capacitances of the composite cells into the transmission lines of the RF-front end. Embodiments of the RF front-end provide wideband flat gain, low noise figure (NF), wideband linearity, and wideband matching at the inputs of the RF front-end. In an embodiment, a programmable resistance at the termination of the RF transmission line allows the RF front-end to trade off a few decibels of mismatch at the RF input for higher gain and lower NF.

15 Claims, 9 Drawing Sheets

OTHER PUBLICATIONS

Zhang et al., "*Low power programmable-gain FMOS distributed LNA for ultra-wideband applications*", Symposium of VLSI Circuits Digest of Technical Papers, 6-1, pp. 78-81 (Jun. 2005).

Lee et al., "*A 3-10 GHz Resistive Feedback Low Noise Amplifier for UWB Applications*", Radio Frequency Integrated Circuits (RFIC) Symposium, 12-14, pp. 545-548 (Jun. 2005).

Chang-Wang Kim et al., "*An Ultra-Wideband CMOS Low Noise Amplifier for 3-5 GHz UWB System*", IEEE Journal of Solid-State Circuits, vol. 40, Issue 2, pp. 544-547 (Feb. 2005).

Ahmad Yazdi et al., "*A 1.8V Three-Stage 25 GHz 3dB-BW Differential Non-Uniform Downsized Distributed Amplifier*", 2005 IEEE International Solid-State Circuits Conference, Digest of Technical Papers, Session 8, vol. 48, pp. 156-158 (Feb. 8, 2005).

Payam Heydari et al., "*A Performance Optimized CMOS Distributed LNA for UWB Receivers*", IEEE 2005 Custom Integrated Circuits Conference, pp. 337-340 (Sep. 2005).

Chang-Wang Kim et al., "*An Ultra-Wideband CMOS Low Noise Amplifier for 3-5-GHz UWB System*", IEEE Journal of Solid-State Circuits, vol. 40, No. 2, pp. 544-547 (Feb. 2005).

Fred S. Lee et al., "*An Ultra-Wideband Baseband Front-End*", IEEE RFIC Symposium, pp. 493-496 (Jun. 2004).

Behzad Razavi et al., "*A 0.13 μm CMOS UWB Transceiver*", 2005 IEEE Solid-State Circuits Conference, Session 11, pp. 26-218 (Feb. 2005).

Sumit Roy et al., "*Ultrawideband Radio Design: The Promise of High Speed, Short-Range Wireless Connectivity*", Proceedings of IEEE, pp. 295-311 (Feb. 2004).

Henrik Sjoland et al., "*A Merged CMOS LNA and Mixer for a WCDMA Receiver*", IEEE Journal of Solid-State Circuits, vol. 38, No. 6, pp. 1045-1050 (Jun. 2003).

Manolis T. Terrovitis et al., "*Noise in Current-Commutating CMOS Mixers*", IEEE Journal of Solid-State Circuits, vol. 34, No. 6, pp. 772-783 (Jun. 1999).

\* cited by examiner

IF TL equivalent circuit

Frequency response of IF TL for different values of $Z_{IF}$, with fixed $\omega_{cut-off}$ The die photo of the proposed UWB DRF Measured S-parameters Measured conversion gain and NF of UWB-DRF Measured gain for different *IF* and for $f_{RF}$=3 and 10GHz with *RF TL* termination of 50Ω ($B_0B_1$="11")

Measured variable gain of UWBDRF for $f_{RF}$ = 3GHz; $f_{IF}$ = 500MHz; RF TL Termination of 50Ω ($B_0B_1$="11")

IIP3 measurements: two tone test of $f_{RF}$ = 3 & 3.01 GHz measured at high gain mode; with matched RF RF TL termination of $B_0B_1$ = "11" or $Z_{RF}$ = 50)

IIP3 measurements; two tone test for $f_{RF}$ = 7 & 7.01 GHz; $f_{IF}$ = 500MHz; RF TL Termination = 50Ω ($B_0B_1$="11")

IIP3 measurements of frequency band of $f_{RF}$ = 10 & 10.01 GHz measured at high gain mode; with matched RF RF TL termination of $B_0B_1$ = "11" or $Z_{RF}$ = 50Ω)

DISTRIBUTED RF FRONT-END FOR UWB RECEIVERS

FIELD OF THE INVENTION

The present invention relates generally to ultra wide-band (UWB) receivers, and more particularly to distributed radio frequency (RF) front ends for UWB receivers.

BACKGROUND OF THE INVENTION

UWB wireless broadcasts are capable of carrying huge amounts of data up to 250 feet with extremely little transmit power and high immunity to interference and multipath fading. Indeed, the spread spectrum characteristics of UWB wireless systems, and the ability of the UWB wireless receivers to highly resolve the signal in multi-path fading channels make them a desirable wireless system of choice in a wide variety of high-rate, short- to medium-range communications. The ability of UWB systems to locate objects to within one inch attracts the military, law-enforcement, and rescue agencies. Other applications include broadband sensing using active sensor networks and collision-avoidance. The circuit techniques that are used to realize different circuit components in a UWB transceiver are quite different from those used in current narrow bandwidth RF technology. This notion provides an incentive to investigate the design of novel circuit topologies that achieve a gain-for-delay-tradeoff without affecting bandwidth, thus operating at substantially higher frequencies than conventional circuits.

The main challenge to design wideband, e.g., ultra-wide-band (UWB), transceivers is to satisfy gain, NF, reverse isolation, and linearity requirements over a wide bandwidth (e.g., 7.5 GHz in a UWB wireless system). Recently, different circuit techniques have been proposed to achieve wideband operation of the RF front-end. [KIM05] presented a resistive feedback amplifier covering the UWB lower frequency band, i.e., 3-5 GHz. The input matching and gain of the circuit in [KIM05], however, drops at higher frequencies due to the dominating effects of the device's parasitic capacitances. A resistive feedback amplifier in bipolar technologies proposed in [LEE05] covers the entire UWB frequency band with minimum NF of around 3.2 dB. Another solution to the UWB LNA design is to transform conventional narrowband techniques to wideband by using higher-order bandpass filters to achieve required wideband input matching [BEV04], [ISM05]. However, the overall gain response and NF of the wideband LNA proposed in [BEV04] vary rather significantly across the UWB frequency band due to existing mismatch from a frequency-dependent inductive-degenerated 50Ω seen from the input of the transistor. The circuit in [ISM05] is designed with bipolar devices. The use of a distributed topology provides the required wideband operation, as shown in [ZHA05], [HEY05]. The main advantage of distributed architecture is its intrinsic wideband matching characteristics [HEY05]. However, distributed architecture circuits are prone to high power dissipation and take up larger chip areas.

SUMMARY

Described herein are ultra wide-band distributed RF (UWB-DRF) front-end receivers comprising composite cells distributed along transmission lines, where each composite cell comprises a low-noise amplifier (LNA) merged with a mixer. By merging the LNA and the mixer in each composite cell, the power consumption and chip area of the RF front-end is reduced. Further, the distributed architecture of the RF front-end allows it to operate over a wide bandwidth by absorbing the parasitic capacitances of the composite cells into the transmission lines of the RF-front end.

Embodiments of the RF front-end provide wideband flat gain, low noise figure (NF), wideband linearity, and wideband matching at the inputs of the RF front-end. In an embodiment, a programmable resistance at the termination of the RF transmission line allows the RF front-end to trade off a few decibels of mismatch at the RF input for higher gain and lower NF.

In an embodiment, each LNA comprises a current-mode transistor driven by an input RF signal and each mixer comprises switching-pair transistors driven by a differential local oscillator (LO) signal.

In an embodiment, an inter-stage inductor is added to each composite cell to prevent frequency roll-off from parasitic capacitances in the cell that are not absorbed into the transmission lines of the RF front-end.

In an embodiment, the RF front-end is fabricated using a CMOS process.

In an embodiment, the load impedance at the IF output of the RF front-end is increased to provide higher gain with a trade off of lower gain flatness over the bandwidth of the RF front-end.

The above and other advantages of embodiments of this invention will be apparent from the following more detailed description when taken in conjunction with the accompanying drawings.

DETAILED DESCRIPTION

Figure 1:
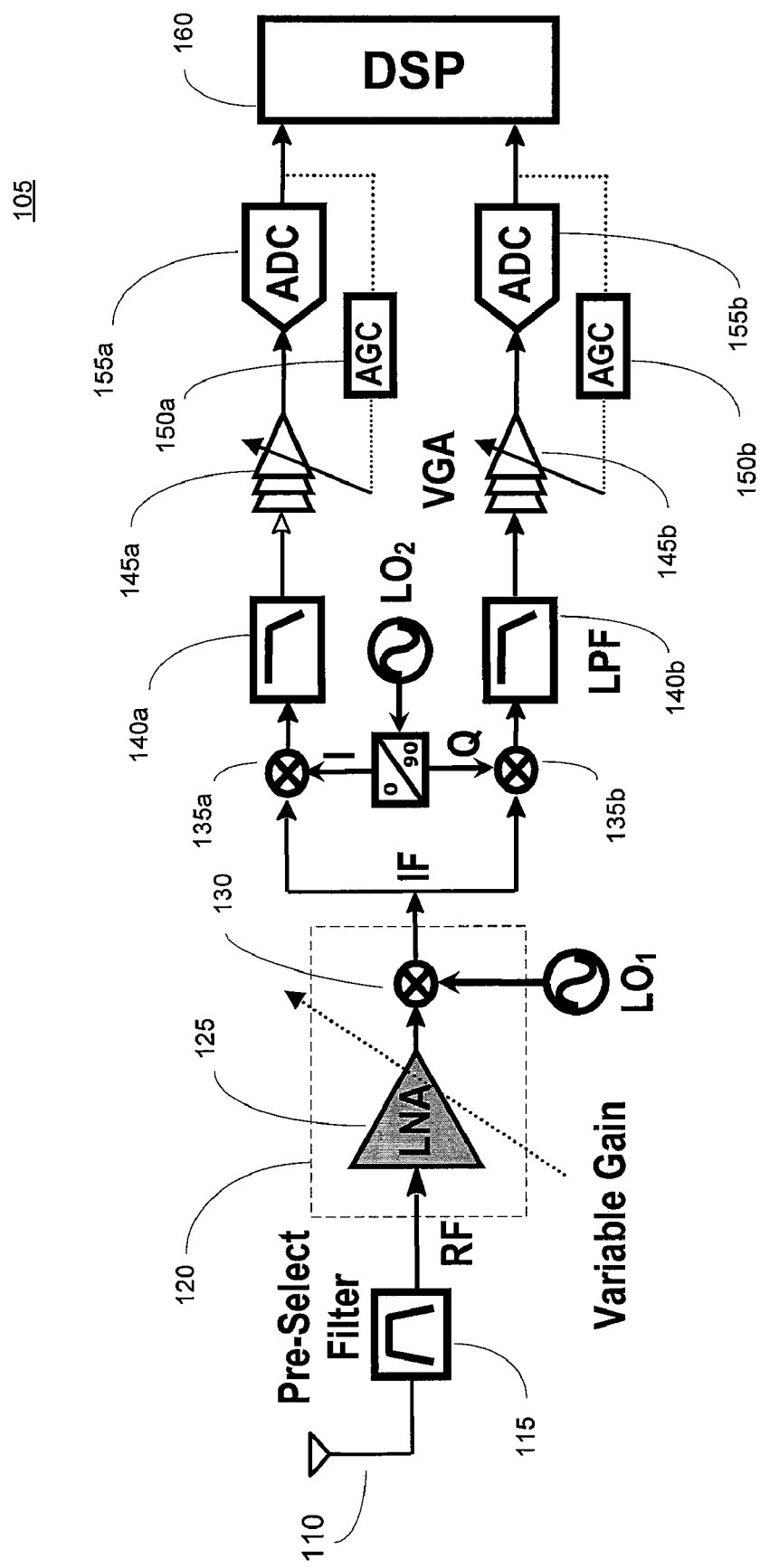
FIG. 1 is a block diagram of an exemplary ultra wide-band (UWB) dual-conversion receiver.

FIG. 1 shows a block diagram of an exemplary UWB zero/low IF dual-conversion receiver 105. The receiver 105 includes an antenna 110 that receives an RF signal, and a pre-select filter 115 that rejects the out-of-band interferences in the received RF signal. The receiver 105 further includes an RF front-end section 120 comprising a low-noise amplifier (LNA) 125 and a mixer 130. The LNA 125 amplifies the RF signal, and the mixer 130 mixes the amplified RF signal with a local oscillator $LO_1$ signal to down convert the signal to an intermediate frequency (IF) signal. In an exemplary embodiment, the IF signal has a frequency of less than 2 GHz. The in-band image frequency in the IF signal will be filtered out using a Weaver-type image-reject architecture in the second down conversion stage in companion with the digital section. The out-of-band image frequencies are also rejected by the pre-select filter 115.

The second down conversion stage has in-phase (I) and quadrature (Q) braches comprising complex I/Q mixers 135*a* and 135*b*. The I/Q mixers 135*a* and 135*b* mix the IF signal with a second local oscillator $LO_2$ signal to further down convert the IF signal to zero/low IF I/Q signals. The $LO_2$ signal to the Q mixer 135*b* is shifted 90° out of phase with respect to the $LO_2$ signal to the I mixer 135*a*. Each I/Q signal then passes through a low-pass filter (LPF) 140*a* and 140*b*, and a variable gain amplifier (VGA) 145*a* and 145*b* whose gain is controlled by automatic gain control (AGC) circuitry 150*a* and 150*b* to set the appropriate signal level for the analog-to-digital converter (ADC) 155*a* and 155*b*. The digital signal processor (DSP) 160 deals with the demodulation of the UWB signal. The receiver 105 shown in FIG. 1 is exemplary only, and other receiver architectures may also be used with embodiments of the invention.

Figure 2:
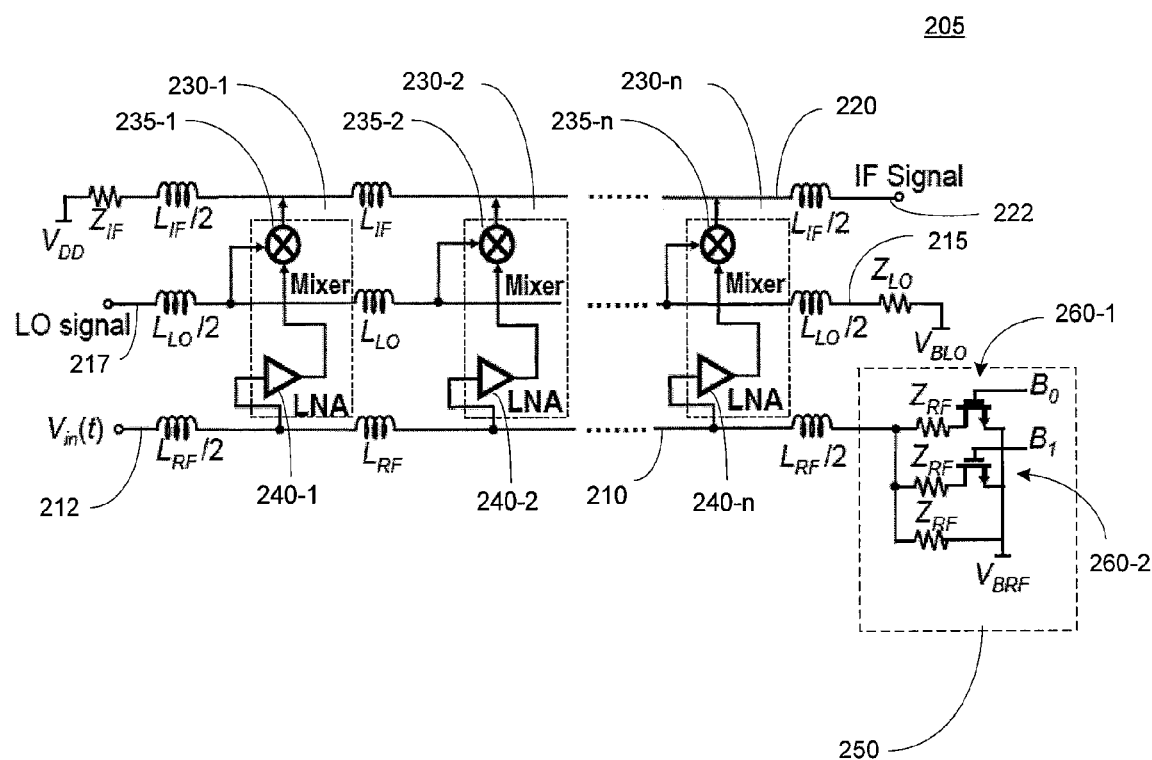
FIG. 2 shows an ultra wide-band distributed RF (UWB-DRF) front-end receiver according to an exemplary embodiment of the present invention.

FIG. 2 shows an ultra wide-band distributed RF (UWB-DRF) front-end 205 according to an exemplary embodiment of the invention, which may be used in the receiver 105 shown in FIG. 1 or other receivers. The UWB-DRF 205 comprises composite cells 230-1-n distributed along transmission lines 210, 215 and 220, where each composite cell 230-1-n comprises an LNA 240-1-n merged with a mixer 235-1-n. In a dual-conversion system, each mixer 235-1-n provides the first down conversion to IF.

The UWB-DRF 205 provides wideband matching characteristics at the RF, LO, and IF ports. Unique features of the UWB-DRF 205 include the following:

1. Wideband matching at the RF, LO, IF ports.
2. Wideband linearity, flat gain, and small noise figure (NF).
3. Re-uses the bias current of LNTA/mixer cells to reduce the power consumption of the distributed RF front-end.
4. Uses a programmable matching network to achieve better performance.

Wideband RF, LO, and IF ports provide the freedom of choosing the appropriate frequencies for the $LO_1$ and $LO_2$ signals which may lead to an even smaller number of synthesized LO frequencies and a less complex frequency synthesizer in the receiver.

Cascading a distributed LNA presented in [HEY05], [YAZ05] and a distributed mixer presented in [SAF05] may provide wideband characteristics at all ports. Nevertheless, these approaches are inefficient from power consumption and chip area perspectives. By distributing composite cells of merged LNTA/mixer, and therefore, re-using the DC bias current and sharing the input wideband TL, the UWB-DRF receiver is able to reduce the power consumption and chip area. The composite cells also beneficiate from higher linearity due to elimination of the high-swing node at the output of the LNA and input to the mixer in conventional cascaded LNA and mixer circuits [SJO03].

In the exemplary embodiment shown in FIG. 2, the UWB-DRF 205 comprises an RF transmission line (TL) 210, a LO transmission line (TL) 215, and an IF transmission line (TL) 220. The RF TL 210 includes an RF port 212 for receiving the RF signal from the antenna, and the IF TL 220 includes an IF port 222 for outputting the IF signal. The transmission lines 210, 215, 220 comprise inductance-capacitance (LC) networks where the inductors are realized using on-chip inductors $L_{RF}$, $L_{LO}$, and LIF, and the capacitors are parasitic capacitances of the LNAs 240-1-n and mixers 235-1-n. Each transmission line 210, 215, 220 comprises n stages where each stage comprises an inductor and a parasitic capacitance. For example, each stage of the RF TL 210 comprises an inductor $L_{RF}$ and the parasitic capacitance of an LNA 240-1-n coupled to the inductor LRF. The characteristic impedance of each transmission line 210, 215, 220 is approximately $\sqrt{L/C}$ where L and C are the inductance and capacitance, respectively, in each stage. In the UWB-DRF 205, parasitic capacitances of the LNAs 240-1-n and mixers 235-1-n are absorbed into the transmission lines 210, 215, 220. As a result, these parasitic capacitances do not cause frequency roll-off at higher frequencies, thereby providing wideband characteristics at the ports. The wideband characteristics at the IF port provides flexibility in choosing the $LO_1$ and $LO_2$ frequencies to optimize the receiver from the NF and linearity perspective.

In an exemplary embodiment, the characteristic impedance of the RF TL 210 is matched to the impedance of the antenna transmission line, e.g., 50Ω. This may be done by selecting the inductance for each inductor $L_{RF}$ based on the corresponding parasitic capacitance such that the characteristic impedance of the RF TL 210 matches the antenna transmission line impedance. The characteristic impedance of the LO TL 215 and IF TL 220 may be the same as that of the RF TL 201, e.g., 50Ω.

Each composite cell 230-1-n comprises an LNA 240-1-n merged with a mixer 235-1-n. The LNA 240-1-n receives the RF signal from the RF TL 210 and amplifies the RF signal. The mixer 235-1-n mixes the amplified RF signal with the LO signal from the LO TL 215 to down convert the RF signal to the IF signal. In a dual-conversion system, the LO signal correspond to the $LO_1$ signal. The IF signal is received on the IF TL 220 where it constructively adds with IF signals from other composite cells 230-1-n traveling toward the IF port 222. In each composite cell 230-1-n, the same bias current flows through the mixer 235-1-n and LNA 240-1-n of the cell, thereby reducing the power consumption of the receiver.

Figure 3A:
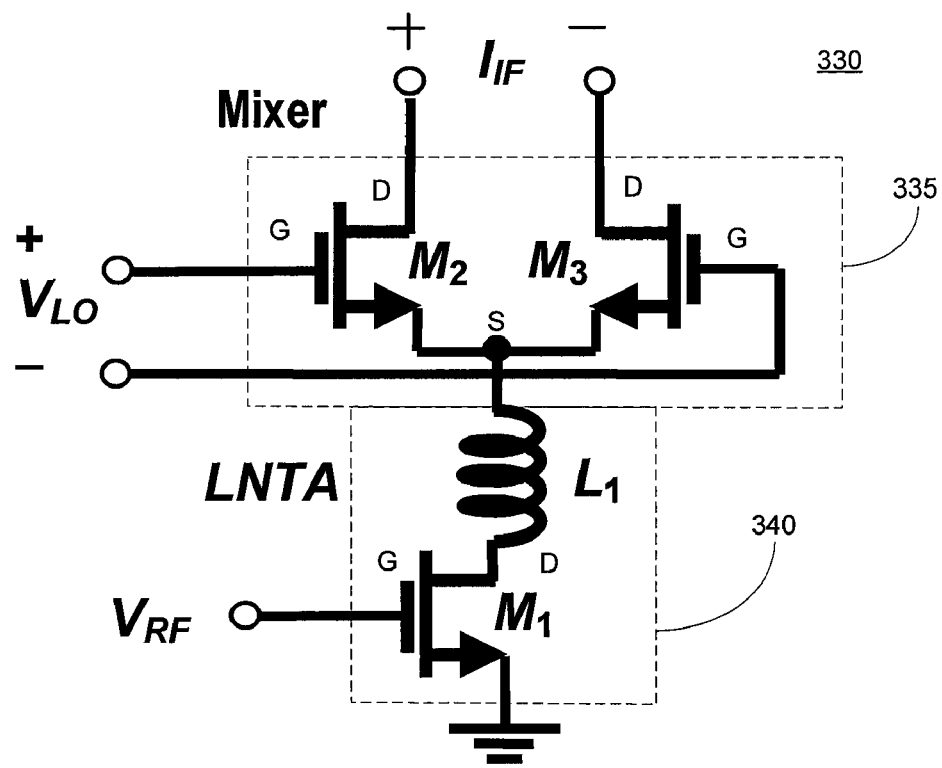
FIG. 3a shows a composite cell of an LNA merged with a mixer according to an exemplary embodiment of the present invention.

FIG. 3*a* shows an exemplary composite cell 330 of merged LNTA/mixer according to an embodiment of the invention. The LNA 340 comprises a MOSFET $M_1$ having a gate G coupled to the RF TL 210 and a drain D coupled to the mixer 335. In this embodiment, the LNA 340 is a current-mode LNA 340 that outputs an RF current signal based on the input RF voltage $V_{RF}$. The mixer 335 comprises two MOSFETs $M_2$ and $M_3$ having sources coupled to a common-source node S, gates G coupled to the LO TL 215 and drains D coupled to the IF TL 220. The two MOSFETs $M_2$ and $M_3$ form switching-pair transistors driven by the differential LO voltage $V_{LO}$. The switching-pair transistors $M_2$ and $M_3$ modulate the output current signal of the LNA 340 with a periodic waveform at the LO frequency producing a differential IF current $I_{IF}$, which is outputted to the IF TL 220. In this embodiment, the LO TL 210 comprises two LO TLs, one for each polarity of the differential LO voltage $V_{LO}$. The gate G of $M_2$ is coupled to one of the LO TLs while the gate of $M_3$ is coupled to the other LO TLs. Similarly, the IF TL 220 comprises two IF TLs, one for each polarity of the differential IF current $I_{IF}$. The differential mixer provides common-mode noise rejection.

Figure 3B:
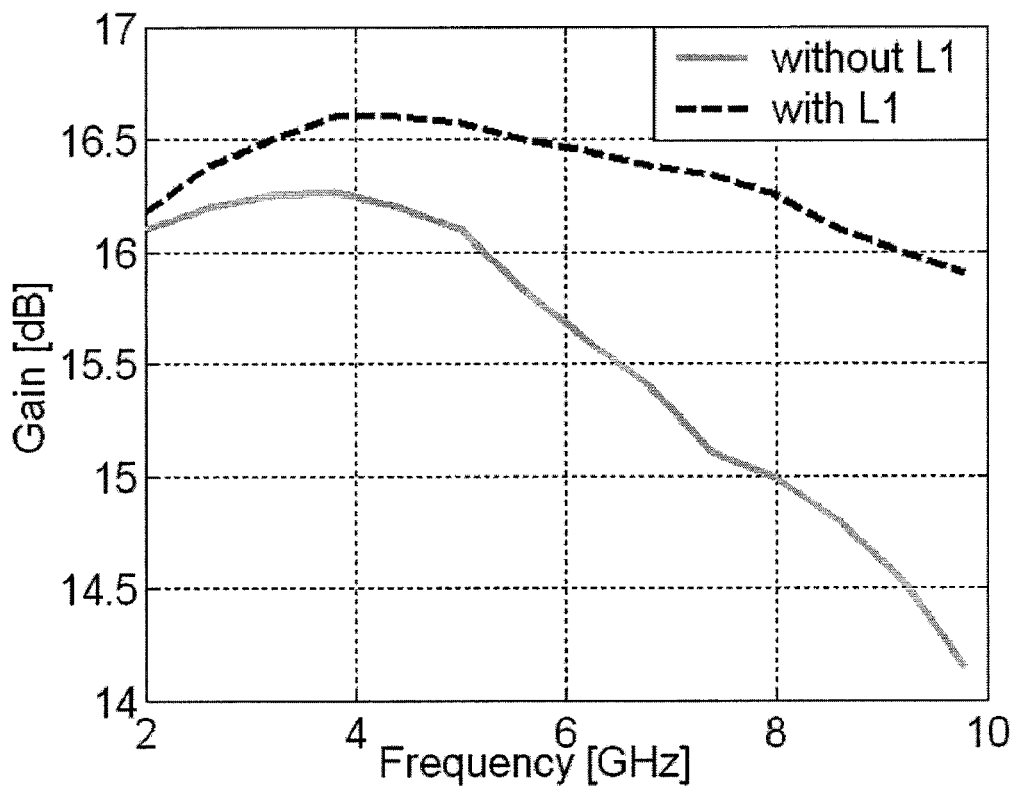
FIG. 3b shows the gain of the receiver with and without an inter-stage inductor $L_1$ over a wide frequency range.

The input and output parasitic capacitances of the composite cell 330 are absorbed into the RF and IF TLs 210 and 220, respectively. However, the parasitic capacitance at the common-source node S, which is not absorbed into the transmission lines, may be large resulting in roll-off of the circuit's frequency response. To alleviate this problem, an inductor $L_1$ may be connected in series with the output of the current-mode LNA 240 to reduce the effective capacitance at the common-source node S, thereby flattening the gain of the RF front-end across a wide range of frequencies. Moreover, inductor $L_1$ avoids the rise of input-referred noise at higher frequencies [HEY05]. FIG. 3b shows simulation results of the gain with and without the inductor $L_1$ over a wide frequency range.

The gain provided by the LNA 240 may be adjusted by adjusting the DC bias voltage $V_{BLO}$ to the LO TL 215 and/or the DC bias voltage $V_{BRF}$ to the RF TL 210. For the current-mode LNA 340 in FIG. 3a, the transconductance, and hence the gain provided by the LNA, may be adjusted by adjusting the DC voltage bias $V_{BLO}$, which sets the DC bias voltage at the common-source node S and hence the drain D of the LNA's transistor.

The overall voltage-gain of the receiver may be expressed as [LEE04].

$$\text{Gain} = (1+\Gamma_L) \times A_V \quad \text{(Eq. 1)}$$

where $A_V$ is the front-end's voltage-gain and $\Gamma_L$ is the reflection coefficient of the receiver's input matching network. In a power matched receiver, $\Gamma_L=0$, and the overall gain becomes $A_V$. In the other extreme case, in a power unmatched receiver, $\Gamma_L=1$ and the total voltage gain of the receiver will increase by 6 dB, however, zero power is transferred from the antenna to the receiver. The 6 dB gain boosting due to the input mismatch is a noiseless gain, and the noise contribution from the circuit remains unchanged. Therefore, the NF will improve by 6 dB as well. Consequently, introducing a few decibels of mismatch at the input matching network of the front-end improves the receiver's voltage gain and NF.

To implement such a variable matching network at the input, the front-end receiver 205 may include variable resistance at the termination of the input RF TL 210 as shown in FIG. 2. In this embodiment, the variable resistance is achieved by a programmable input matching network 250 comprising three resistors where each resistor has a resistance of $Z_{RF}$. Two of the resistors are connected to switches 260-1 and 260-2, e.g., MOSFET switches, which are digitally controlled by two bits of $B_0$ and $B_1$. When both switches are open ($B_0B_1$="00"), the resistance of the network 250 is $Z_{RF}$. When one switch is open and the other switch is closed ($B_0B_1$="01" or $B_0B_1$="10"), the resistance of the network is $Z_{RF}/2$, and when both switches are closed ($B_0B_1$="11"), the resistance of the network is $Z_{RF}/3$. In an exemplary embodiment $Z_{RF}$=150Ω, allowing the termination resistance of the RF TL 210 to be set to a resistance of 50Ω, 75Ω or 150Ω. For an antenna line impedance of 50Ω, setting the termination resistance to 50Ω provides an input impedance match. Setting the termination resistance to 75Ω or 150Ω causes an input mismatch with a resulting increase in the voltage gain and NF. Increasing the termination resistance increases the voltage gain and NF up to 6 dB for an infinite termination resistance, at which point no power is transferred to the receiver from the antenna.

Figure 7:
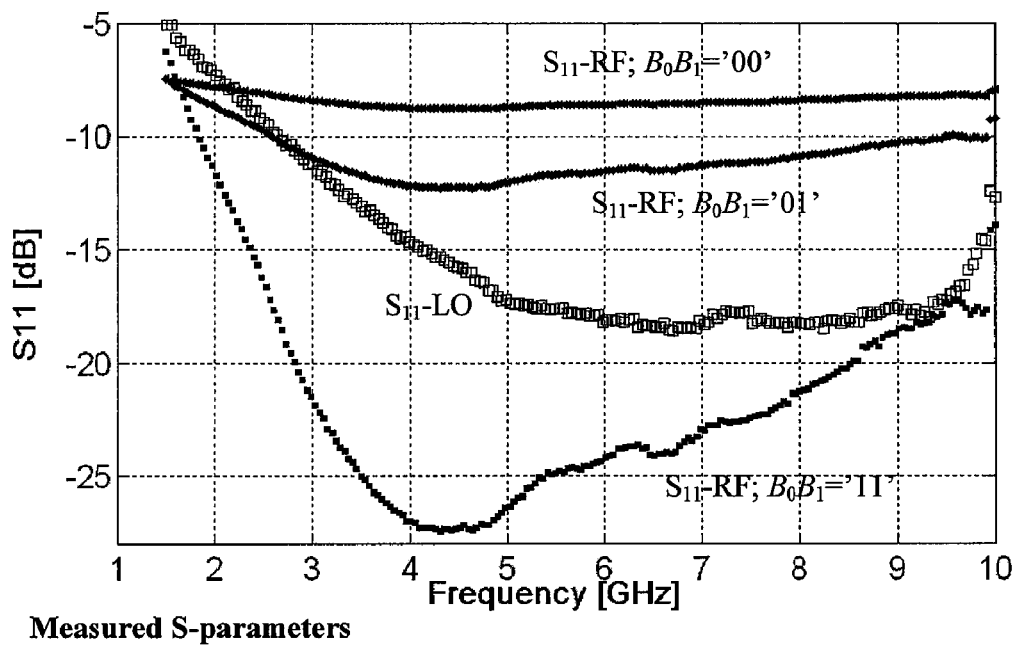
FIG. 7 shows measured S-parameters over frequency for different termination resistances of the RF transmission line.
Figure 8:
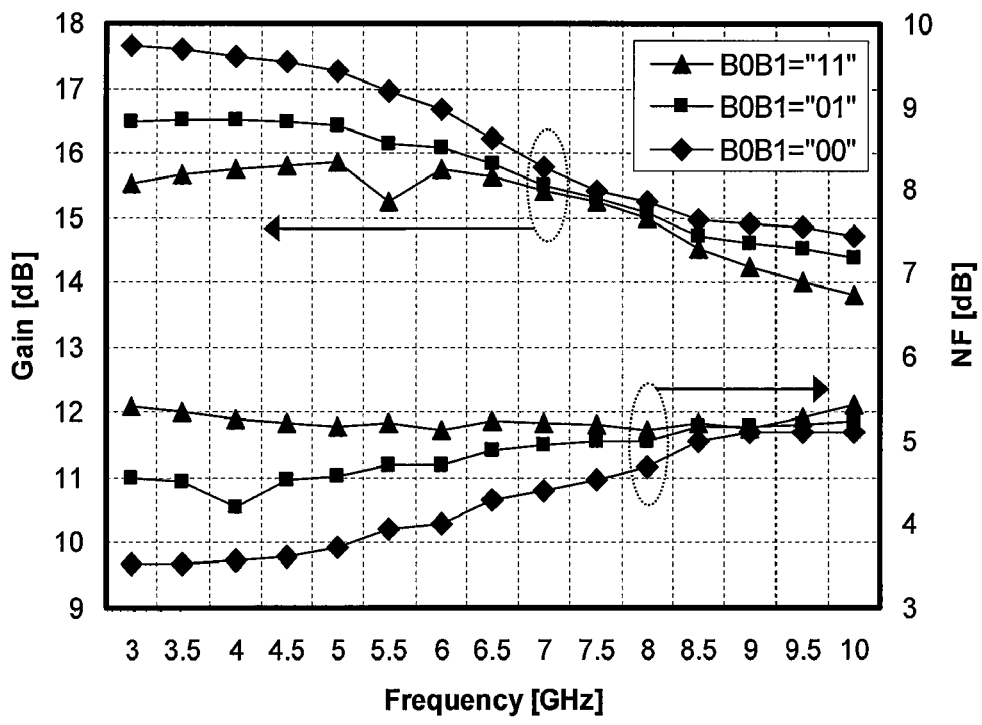
FIG. 8 shows measured conversion gain and NF of the UWB-DRF over a wide frequency range.

Measurement results in FIGS. 7 and 8 demonstrate a gain increase of 2.2 dB and a NF improvement of 1.7 dB for the maximum termination resistance of 150Ω, while preserving the input return loss ($s_{11}$) to better than −7.5 dB (i.e., a voltage standing wave ratio "VSWR" of better than 2.45) across the UWB band.

The input matching network 250 shown in FIG. 2 is exemplary only, and other networks may be used having any number of resistors and switches in different configurations. The resistors in the network need not all have the same resistance. Further, the variable resistance may be achieved by other means, e.g., a transistor whose resistance is controlled by a control voltage.

To calculate the conversion gain of the UWB DRF in FIG. 2, a study of signal propagation along the TLs, and the non-linear mixing operation taking place at each composite cell is provided below.

The RF input signal experiences a delay of $(k-0.5) \times t_{RF}$ along the RF TL 210 to arrive at the $k^{th}$ stage of the distributed receiver, which is then converted to current through the LNTA 235-1-n and is mixed with the delayed version of LO signal input to the mixer 240-1-n. The differential IF component of the $k^{th}$ stage's output current traveling forward toward the load may be expressed as:

$$i_{o,k}(t) = \frac{1}{2} g_m \cdot V_{RF} \sin\left(\omega_{RF}\left(t - \left(k - \frac{1}{2}\right) t_{RF}\right)\right) \cdot p_1\left(\omega_{LO}\left(t - \left(k - \frac{1}{2}\right) t_{LO}\right)\right) \quad \text{(eq. 2)}$$

where $g_m$ is the small-signal transconductance of the LNTA tail current transistor, and $V_{RF}$ is the input signal amplitude. The ½ coefficient comes from the fact that half of the IF current travels forward to the load, and the other half travels backward to the IF TL termination. In Eq. 2, $t_{RF}$ and $t_{LO}$ are the delays of each LC section of the RF and LO TLs 215 and 220, respectively; $p_1(t)$ is a periodic waveform with a fundamental component of $\omega_{LO}$, and represents the instantaneous current gain of the switching-pair transistors from RF current to differential output IF current, and is expressed in terms of the instantaneous $g_{m1}$ and $g_{m2}$ [TER99]:

$$p_1(t) = \frac{g_{m1}(t) - g_{m2}(t)}{g_{m1}(t) + g_{m2}(t)} \quad \text{(Eq. 3)}$$

Assuming sufficiently large LO amplitude and negligible LO TL loss, the first harmonic of $p_1(t)$ is $p_{11} \cong 2/\pi$.

The forward IF component of the $k^{th}$ stage experiences another delay of $(k-0.5) \times t_{IF}$ along IF TL 220 to reach to the output load. Therefore, the total output current written in phasor domain, neglecting inductor losses is:

$$I_o = \frac{1}{\pi} g_{mRF} V_{RF} \quad \text{(Eq. 4)}$$
$$\sum_{k=1}^{n} 1 \angle [(\omega_{LO} t_{LO} - \omega_{RF} t_{RF})(k - 0.5) - \omega_{IF} t_{IF}(n - k + 0.5)]$$

To maximize the conversion gain, all the current phasors from all the n distributed composite cells 230-1-n should arrive at the output with the same phase to add up constructively. Therefore, the argument of Eq. 4 should be independent of k. This implies that:

$$\omega_{RF} t_{RF} - \omega_{LO} t_{LO} = \omega_{IF} t_{IF} \quad \text{(Eq. 5)}$$

Figure 4:
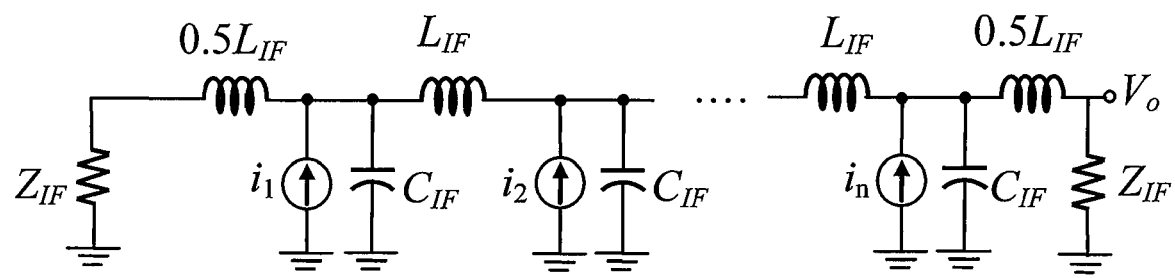
FIG. 4 shows an equivalent circuit for an intermediate frequency (IF) transmission line according to an exemplary embodiment of the present invention.

One simple wide-band solution to Eq. 4 is to choose the delay of the LC sections of the RF, LO, and IF TLs to be equal, which readily results in the conspicuous relationship between the RF, LO, and IF frequencies (i.e., $\omega_{RF}-\omega_{LO}=\omega_{IF}$). Neglecting inductor losses, the maximum conversion gain, $G_{c,max}$, is:

$$G_{c,max} = \frac{n}{\pi} g_{mRF} Z_{IF} \quad \text{(Eq. 6)}$$

where $g_{mRF}$ is the small signal transconductance of the LNTAs and $Z_{IF}$ is the impedance at the IF output. A nominal impedance of 50Ω for the output termination ($Z_{IF}$=50Ω) results in an inadequate gain of approximately 8 dB, as also demonstrated in [ZHA05], [HEY05]. The gain $G_{c,max}$ is boosted by increasing either the number of stages, n, or the LNTA's transconductance, $g_{mRF}$, both of which lead to additional power consumption. Another solution is to increase $Z_{IF}$ at the output while preserving the cut-off frequency of the IF TL 220, $\omega_{cut-off}=2/\sqrt{L_{IF}C_{IF}}$, to sustain the criterion in Eq. 5. However, increasing the characteristic impedance of the IF TL, $Z_D=\sqrt{L_{IF}/C_{IF}}$, while keeping $\omega_{cut-off}$ constant, leads to excessively large values of inductors. On the other hand, increasing $Z_{IF}$, while retaining $\omega_{cut-off}$ and $Z_D$, results in larger passband ripples. The ripple is roughly equal to a gain boosting factor of 20log($Z_{IF}/Z_D$) compared to the matched load, $Z_{IF}=Z_D$. FIG. 4 shows the IF TL's equivalent circuit, where $i_2$ to $i_n$ are delayed versions of $i_1$.

At substantially lower frequency than $\omega_{cut-off}$, the inductors, $L_{IF}$, have negligible impedances, and the circuit is simplified to a parallel combination of $nC_{IF}$ and $Z_{IF}/2$. Therefore, the first roll-off of the conversion gain's ripple, $\omega_{ripple}$, happens at:

$$\omega_{ripple} = \frac{2}{nZ_{IF}C_D} = \frac{Z_D}{Z_{IF}} \frac{\omega_{cut-off}}{n} \quad \text{(Eq. 7)}$$

Figure 5:
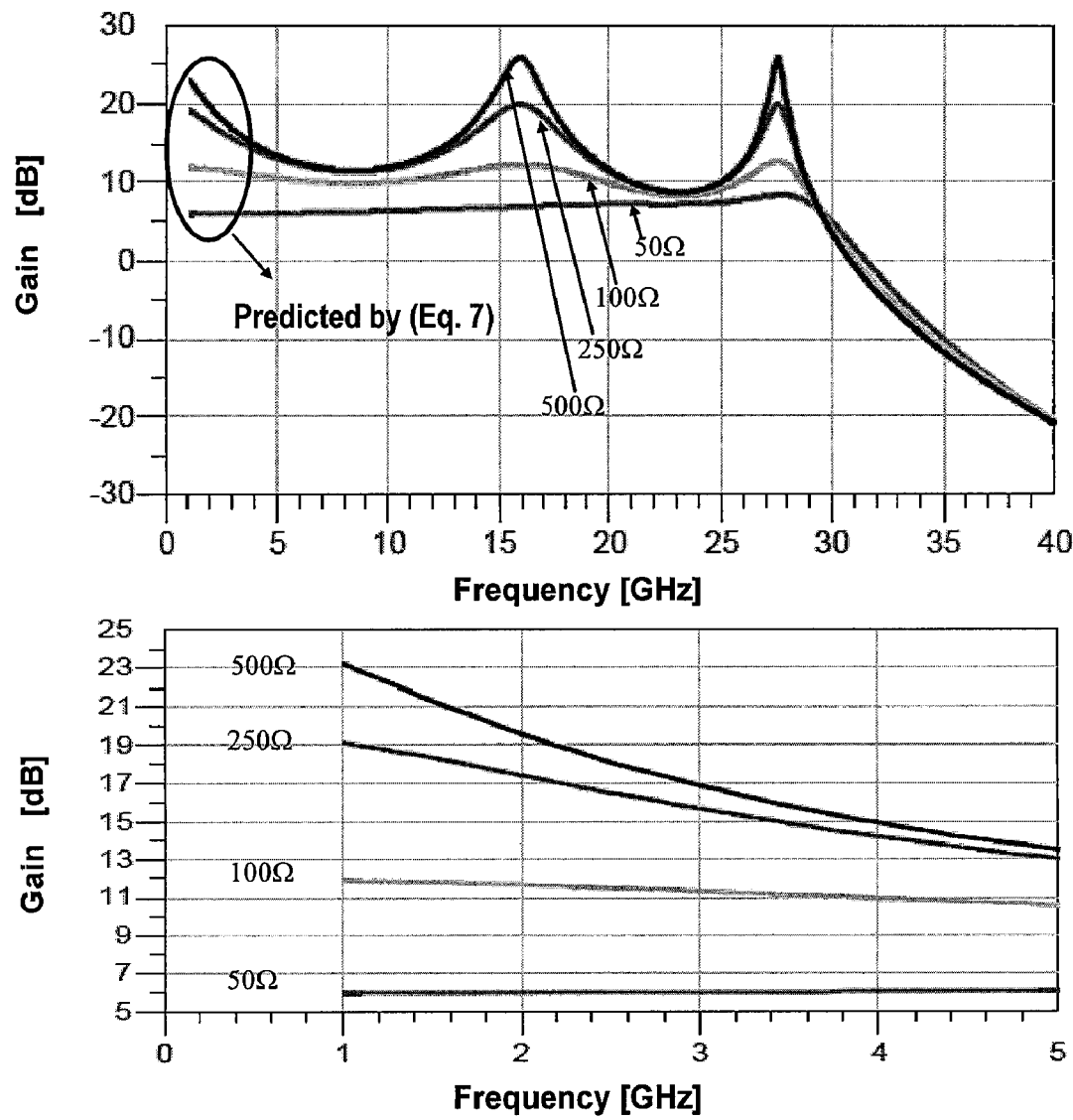
FIG. 5 shows the frequency response of the IF transmission line for different values of $Z_{IF}$.

Eq. 7 states that the gain flatness of the IF TL is traded with the extra gain of the whole RF front-end. This is demonstrated in FIG. 5 which shows simulation results of the circuit of FIG. 4 for n=3. FIG. 5 shows the gain for $Z_{IF}$=50Ω, 100Ω, 250Ω and 500Ω over frequency where the characteristic impedance $Z_D$ of the IF TL is 50Ω. The ripples in FIG. 5 are outside the frequency band for an IF of less than 2 GHz, and therefore can be filtered out by the receiver. FIG. 5 also shows that gain flatness is traded for increases in the gain with increasing $Z_{IF}$.

The delay of the LC sections of the RF, LO, and IF TLs can be made equal by having the same inductances L and capacitances C in the LC sections of the RF, LO, and IF TLs. As an example, the parasitic capacitances along the RF TL may be larger than the parasitic capacitances along the IF TL. In this example, capacitors may be added along the IF TL to equalize the capacitances along the IF and RF TLs. The inductors along the IF and RF TLs may have the same inductances.

Figure 6:
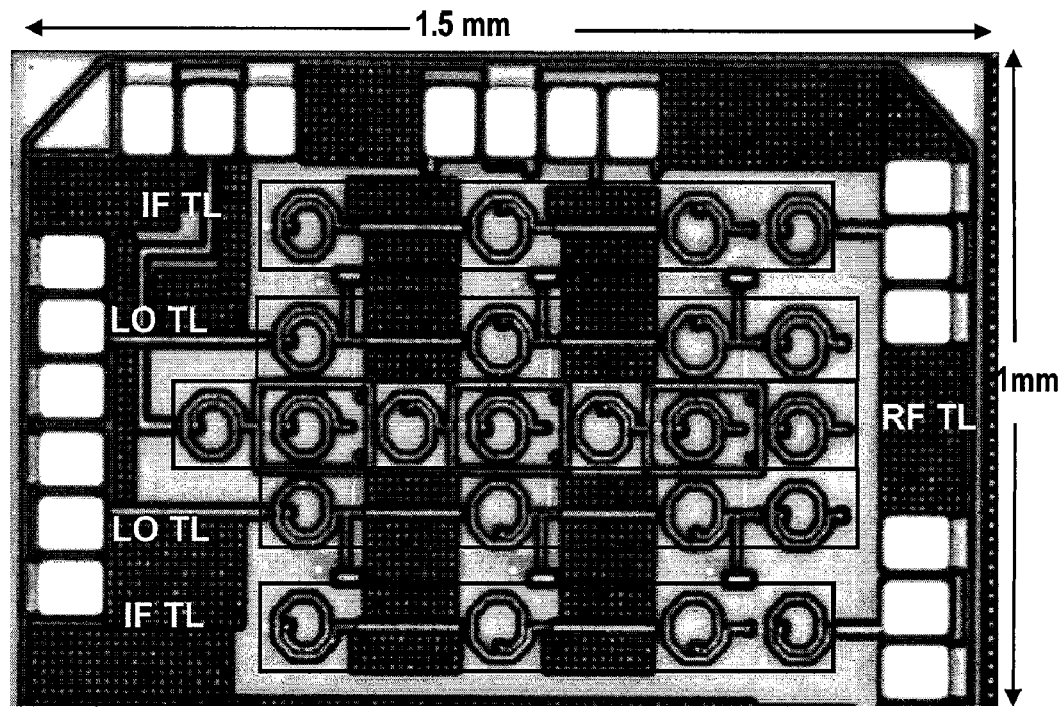
FIG. 6 shows a die photo of an UWB-DRF front-end receiver according to an exemplary embodiment of the present invention.

Measurement results for an exemplary UWB-DRF will now be given. In this example, a 3-stage UWB-DRF incorporating composite LNTA/mixer cells along the artificial TLs (shown in FIG. 2) was fabricated in a 0.13 μm CMOS process. The distributed inductance and capacitance were approximately 300 pH and 100 fF, respectively. FIG. 6 shows the die photo of the UWB-DRF. To mitigate high-frequency signal integrity effects, the circuit was laid out carefully to retain symmetry. More precisely, the single-ended RF TL was laid out to be equidistant from the LO and IF TLs. Furthermore, the differential LO and IF TLs were placed on both sides of the RF TL. The chip area is 1.5 mm×1 mm.

Figure 9:
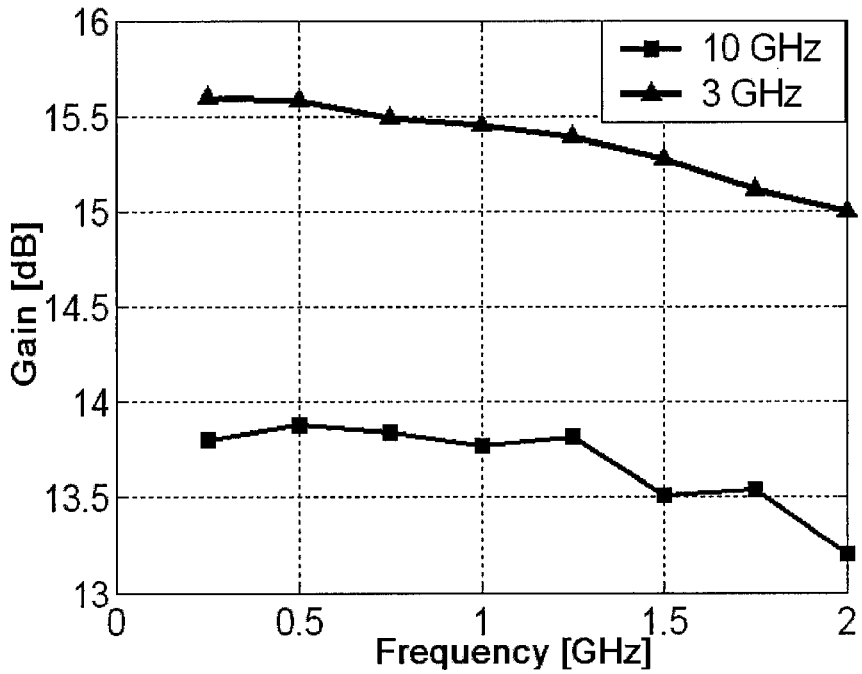
FIG. 9 shows measured gain for different IF and for $f_{RF}$=3 and 10 GHz with an RF TL termination resistance of 50Ω.
Figure 10:
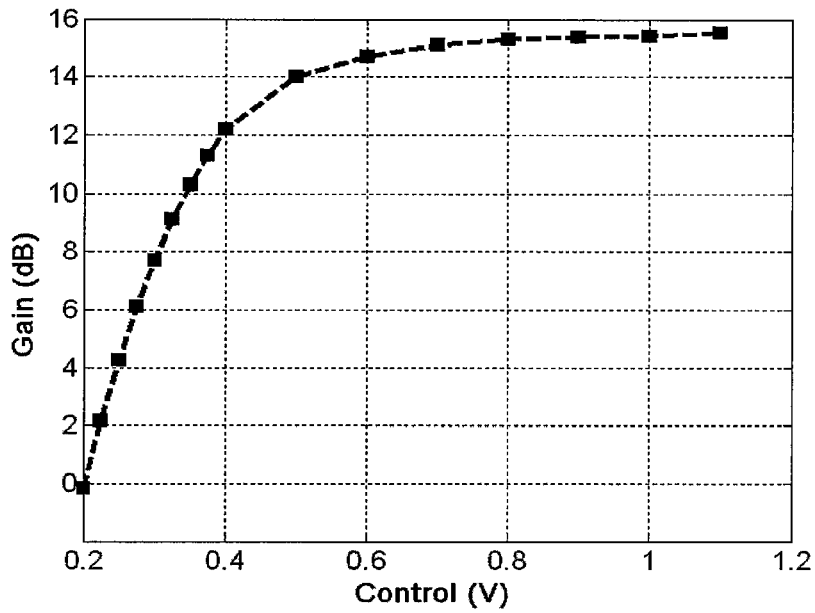
FIG. 10 shows measured variable gain of the UWB-DRF for $f_{RF}$=3 GHz, $f_{IF}$=500 MHz, and RF TL termination resistance of 50Ω.
Figure 11A:
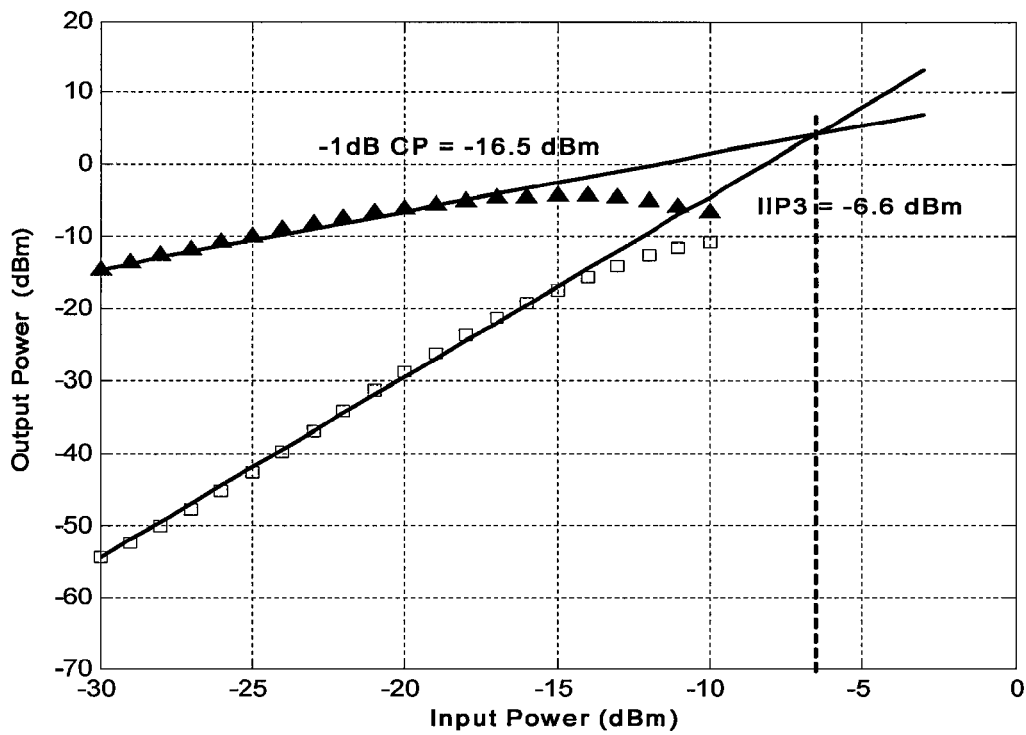
FIGS. 11a-11c show IIP3 measurements of the UWB-DRF demonstrating the wideband linearity of the UWB-DRF.
Figure 11B:
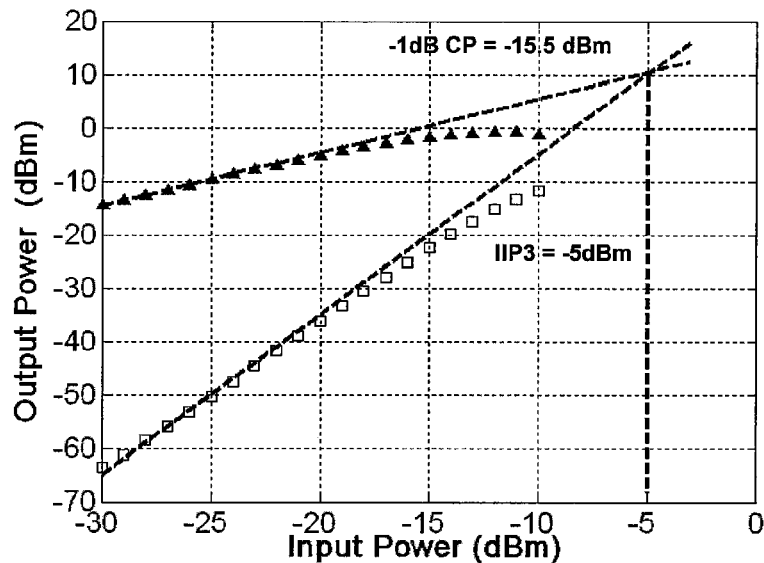
Figure 11C:
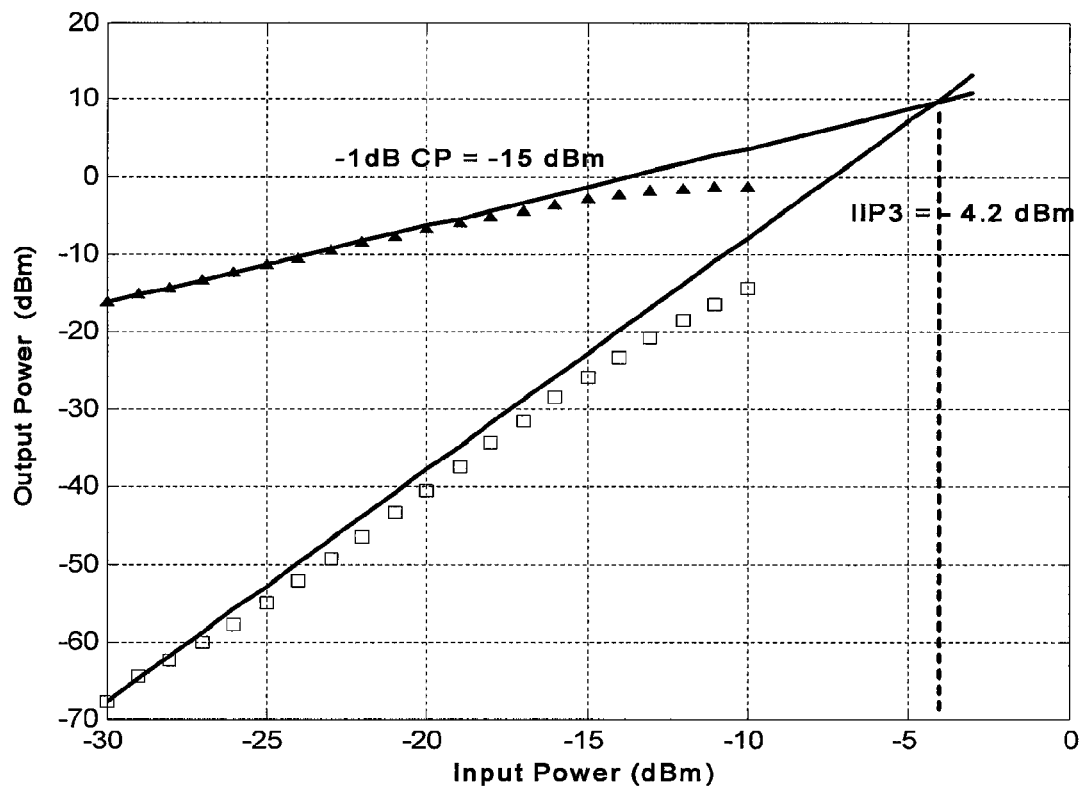

The s-parameters of the UWB-DRF for different values of the RF TL termination bits ($B_0B_1$) were measured on a wafer using an Agilent N5230A network analyzer. FIG. 7 shows the s-parameter measurement results. The UWB-DRF shows input return losses of the LO and RF input ports that were much better than −10 dB across the UWB frequency band for the 50Ω matching case (i.e., $B_0B_1$="00"). The gain and NF were measured over a wide range of frequencies for different codewords ($B_0B_1$) of the RF TL termination. FIGS. 7 and 8 demonstrate that few decibels of mismatch at the input ($B_0B_1$="01" or "00") results in almost a 2.2 dB increase in conversion gain and 1.7 dB improvement of the front-end NF. This is due to the existence of noiseless gain at the input matching network. The NF and gain were measured for an IF value of 500 MHz. The gain variation of the UWB-DRF (with RF TL of 50Ω) was measured for different IF values, and for two input RF frequencies of 3 and 10 GHz, as shown in FIG. 9, which also exhibits almost flat conversion gain characteristics over the IF bandwidth. FIG. 10 shows the measured variable gain of the UWB-DRF, controlled by the common-mode voltage of the switching-pair transistors. Lowering the common-mode voltage keeps the tail current of the LNA transistor in the triode region, thereby decreasing its $g_m$, and hence, decreasing the gain. Meanwhile, the input capacitance of the tail LNTA varies slightly, therefore, input matching is preserved. The measured IIP3 varies from −6.6 to −4.2 dBm for the input frequencies of 3-10 GHz, verifying a wideband linearity of the UWB-DRF. The measured IIP3 for two-tone test of frequency pairs of $f_{RF}$=(3 & 3.01), (7 & 7.01), and (10 & 10.01) GHz for RF TL termination of 50Ω ($B_0B_1$="11") are shown in FIGS. 11(a)-(c).

Table 1 summarizes the measured performance of the UWB-DRF in the power matched case when the RF TL termination is of 50Ω or ($B_0B_1$="11") for the entire bandwidth of UWB frequency range.

TABLE 1

Measured Summary of the UWB-DRF for RF TL = 50 Ω

| | $f_{RF}$ [GHz] | | | | | | | |
|---|---|---|---|---|---|---|---|---|
| | 3 | 4 | 5 | 6 | 7 | 8 | 9 | 10 |
| Gain [dB] | 15.5 | 15.8 | 15.8 | 15.8 | 15.4 | 15 | 14.2 | 13.8 |
| NF [dB] | 5.4 | 5.3 | 5.2 | 5.1 | 5.2 | 5.1 | 5.2 | 5.4 |
| IIP3 [dBm] | −6.6 | −6.3 | −5.9 | −5.4 | −5 | −4.9 | −4.5 | −4.2 |

Table 2 below compares the UWB-DRF's performance with minimum and maximum RF TL termination ($B_0B_1$="11" and "00", i.e. 50 and 150Ω, respectively) with recently published works [ISM05], [RAZ05]. The UWB-DRF achieves flatter NF for the entire UWB frequency range in the power matched case ($B_0B_1$="00").

Therefore, measurements of the three-stage UWB-DRF showed a 3.5-5.4 dB NF and a conversion gain of 17.7-13.8 dB over the UWB bandwidth. The UWB-DRF exhibited an average IIP3 of −5 dBm. The UWB-DRF also showed wideband performance at the RF, LO, and IF ports. The current consumption was 8.2 mA from a 1.8V supply voltage.

TABLE 2

Performance Comparison of UWB Receiver Front-End

| Reference | Freq. range (GHz) | Gain (dB) | NF (dB) | IIP3 (dBm) | Power (mW) | Technology |
|---|---|---|---|---|---|---|
| [RAZ05] | 3-5 | 69-73 | 6.5-8.4 | >−17.5 | 105 (w/TX) | 0.13 μm CMOS |
| [ISM05] | 3-8 | 51-52 | 3.3-4.1 | >−4.5 | 237.6 (w/ Synthesizer) | SiGe BiCMOS, using bipolar |
| UWB-DRF | | | | | | |
| $B_0B_1$ = "11" | 3-10.5 | 15.5-13.8 | 5.2-5.4 | >−6.6 | 14.8 | 0.13 μm CMOS |
| $B_0B_1$ = "10" | | 16.5-14.4 | 4.5-5.2 | >−7 | | |
| $B_0B_1$ = "00" | | 17.7-14.7 | 3.5-5.1 | >−7.5 | | |

Although the present invention has been described in terms of the presently preferred embodiments, it is to be understood that the disclosure is not to be interpreted as limiting. Various alterations and modifications will no doubt become apparent to those skilled in the art after having read this disclosure. Accordingly, it is intended that the appended claims be interpreted as covering all alterations and modifications as fall within the spirit and scope of the invention.

REFERENCES

[ROY04] S. Roy et al., "Ultra wide-band Radio Design: The Promise of High-Speed, Short-Range Wireless Connectivity," *Proceedings of IEEE*, pp. 295-311, February 2004.

[KIM05] C. W. Kim, M. S. Kang, P. Anh, H. Kim, S. Lee; "An Ultra-Wideband CMOS Low Noise Amplifier for 3-5-GHz UWB System" *IEEE Journal of Solid-State Circuits*, Vol. 40, No. 2, pp. 544-547, February 2005.

[LEE05] J. Lee, J. D. Cressler, "A 3-10 GHz SiGe resistive feedback low noise amplifier for UWB applications", *IEEE RFIC Symp.*, pp. 545-548, June 2005.

[BEV04] A. Bevilacqua, A. Niknejad, "An ultrawideband CMOS low-noise amplifier for 3.1-10.6-GHz wireless receivers," *IEEE Journal of Solid-State Circuits*, Vol. 39, No. 12, pp. 2259-2268, December 2004.

[ISM05] A. Ismail, A. Abidi, "A 3.1 to 8.2 GHz direct conversion receiver for MB-OFDM UWB communications," *IEEE Solid-State Circuits Conference*, pp. 208-210, February 2005.

[ZHA05] F. Zhang, P. Kinget, "Low power programmable-gain CMOS distributed LNA for ultra-wideband applications," *Symp. on VLSI Circuits*, pp. 78-81, June 2005.

[HEY05] P. Heydari and D. Lin, "A Performance Optimized CMOS Distributed LNA for UWB Receivers," *IEEE CICC*, pp. 337-340, September 2005.

[YAZ05] A. Yazdi, D. Lin, P. Heydari, "A 1.8V Three-Stage 25 GHz 3 dB-BW Differential Non-Uniform Downsized Distributed Amplifier," *IEEE ISSCC*, pp. 156-157, February 2005.

[SAF05] A. Safarian, A. Yazdi, P. Heydari, "Design and Analysis of an Ultra Wide-band Distributed CMOS Mixer," *IEEE TVLSI Systems*, Vol. 13, No. 5, pp. 618-629, May 2005.

[SJO03] H. Sjoland, A. Karimi, A. Abidi, "A merged CMOS LNA and mixer for a WCDMA receiver," *IEEE Journal of Solid-State Circuits*, Vol. 38, No. 6, pp. 1045-1050, June 2003.

[LEE04] F. S. Lee, D. Wentzloff,. A. P. Chandrakasan, "An ultra-wideband baseband front-end," *IEEE RFIC Symp.* pp. 493-496, June 2004.

[TER99] N. T. Terrovitis, R. G. Meyer, "Noise in Current-Commuting CMOS Mixers," *IEEE Journal of Solid-State Circuits*, Vol. 34, No. 6, pp. 772-783, June 1999.

[RAZ05] B. Razavi, T. Aytur, F. Yang, R. Yan, H. Kang, C. Hsu, C. Lee; "A 0.13 □m CMOS UWB transceiver", *IEEE Solid-State Circuits Conference*, pp. 216-218, February 2005.

What is claimed is:

1. A radio frequency (RF) front-end circuit, comprising:
an RF transmission line;
a local oscillator (LO) transmission line;
an intermediate frequency (IF) transmission line; and
a plurality of composite cells, wherein each composite cell comprises:
a low-noise amplifier (LNA); and
a mixer coupled to the LNA;
wherein the plurality of composite cells are distributed along the RF, LO and IF transmission lines.

2. The circuit of claim 1, further comprising a variable resistance coupled to a termination of the RF transmission line.

3. The circuit of claim 2, wherein the variable resistance comprises:
a bank of parallel resistors; and
a least one switch coupled to at least one of the resistors.

4. The circuit of claim 2, wherein the variable resistance is programmable to any one of a plurality of resistances, and wherein one of the plurality of resistances is within a range of 75 to 150Ω.

5. The circuit of claim 4, wherein one of the plurality of resistances is within a range of 100 to 150Ω.

6. The circuit of claim 1, wherein each composite cell comprises an inductor coupled between the LNA and the mixer in the cell.

7. The circuit of claim 1, wherein the RF, LO and IF transmission lines each have a characteristic impedance of approximately 50Ω.

8. The circuit of claim 1, wherein each mixer comprises a pair of switching transistors.

9. The circuit of claim 8, wherein each pair of switching transistors is configured to be driven by a differential local oscillator (LO) signal.

10. The circuit of claim 8, wherein each switching transistor comprises a metal-oxide-semiconductor field-effect transistor (MOSFET).

11. The circuit of claim 8, wherein the LNA comprises a current-mode transistor that outputs a current to the corresponding mixer based on an input RF voltage.

12. The circuit of claim 1, wherein the RF, LO and IF transmission lines comprise on-chip inductors.

13. The circuit of claim 1, further comprising a load coupled to a termination of the IF transmission line, wherein the IF transmission line has a characteristic impedance of approximately 50Ω and the load has an impedance of at least 100Ω.

14. The circuit of claim 13, wherein the load has an impedance of at least 150Ω.

15. The circuit of claim 13, wherein the load has an impedance of at least 200Ω.

* * * * *

UNITED STATES PATENT AND TRADEMARK OFFICE
CERTIFICATE OF CORRECTION

PATENT NO.          : 7,792,513 B2
APPLICATION NO.     : 11/857696
DATED               : September 7, 2010
INVENTOR(S)         : Aminghasem Safarian, Lei Zhou and Payam Heydari It is certified that error appears in the above-identified patent and that said Letters Patent is hereby corrected as shown below:

Add the following paragraph at Column 1, before the Field of the Invention:

--This invention was made with Government support under grant 0449433 awarded by the National Science Foundation. The Government has certain rights in this invention.--

Signed and Sealed this
Thirteenth Day of March, 2012

David J. Kappos
*Director of the United States Patent and Trademark Office*